United States Patent
Hunt et al.

(10) Patent No.: US 7,735,064 B2
(45) Date of Patent: Jun. 8, 2010

(54) METHOD AND APPARATUS FOR EVALUATING SOFTWARE

(75) Inventors: Charles B. Hunt, Keiser, AR (US); Harry D. Jamieson, Memphis, TN (US)

(73) Assignee: United States Postal Service, Washington, DC (US)

( * ) Notice: Subject to any disclaimer, the term of this patent is extended or adjusted under 35 U.S.C. 154(b) by 1421 days.

(21) Appl. No.: 10/450,497

(22) PCT Filed: Dec. 14, 2001

(86) PCT No.: PCT/US01/47647
§ 371 (c)(1), (2), (4) Date: Jun. 16, 2003

(87) PCT Pub. No.: WO02/48879
PCT Pub. Date: Jun. 20, 2002

(65) Prior Publication Data
US 2004/0031021 A1 Feb. 12, 2004

(51) Int. Cl.
*G06F 9/44* (2006.01)
(52) U.S. Cl. ............... 717/124; 717/125; 717/126; 717/127; 702/123; 714/38
(58) Field of Classification Search ......... 717/128–164, 717/125–135; 705/7, 402, 406, 209; 703/2; 700/219; 714/38; 702/123
See application file for complete search history.

(56) References Cited

U.S. PATENT DOCUMENTS

| | | | | |
|---|---|---|---|---|
| 4,644,541 A | * | 2/1987 | Linkowski | 714/49 |
| 5,072,400 A | * | 12/1991 | Manduley | 700/226 |
| 5,079,714 A | * | 1/1992 | Manduley et al. | 700/219 |
| 5,475,753 A | | 12/1995 | Barbara et al. | |
| 5,675,733 A | | 10/1997 | Williams | |
| 6,067,412 A | | 5/2000 | Blake et al. | |
| 6,170,742 B1 | | 1/2001 | Yacoob | |
| 6,182,136 B1 | | 1/2001 | Ramanathan et al. | |
| 6,192,403 B1 | | 2/2001 | Jong et al. | |
| 2002/0082935 A1 | * | 6/2002 | Moore et al. | 705/26 |
| 2003/0179906 A1 | * | 9/2003 | Baker et al. | 382/101 |
| 2006/0167665 A1 | * | 7/2006 | Ata | 703/2 |
| 2006/0178918 A1 | * | 8/2006 | Mikurak | 705/7 |

OTHER PUBLICATIONS

International Search Report, May 9, 2002.

* cited by examiner

*Primary Examiner*—Lewis A Bullock, Jr.
*Assistant Examiner*—Michael Yaary
(74) *Attorney, Agent, or Firm*—Finnegan, Henderson, Farabow, Garrett & Dunner, LLP

(57) ABSTRACT

A method and system for evaluating software includes generating a test deck (310), where the test deck is formulated to test the software for compliance with delivery system operation procedures (315), processing the test deck with the software, and grading the performance of the software for compliance with delivery system operation procedures (320).

25 Claims, 6 Drawing Sheets

METHOD AND APPARATUS FOR EVALUATING SOFTWARE

RELATED APPLICATION

Under provisions of 35 U.S.C. §119(e), the Applicant claims the benefit of U.S. provisional application No. 60/255, 394 filed Dec. 15, 2000, which is expressly incorporated herein by reference.

TECHNICAL FIELD

The present invention relates to the field of evaluating software. More particularly, the present invention, in various specific embodiments, involves methods and systems directed to grading the performance of software for compliance with delivery system operation procedures.

BACKGROUND

The United States Postal Service (USPS) is an independent government agency that provides mail delivery and other services to the public. The USPS is widely recognized as a safe and reliable means for sending and receiving mail and other items. With the advent and steady growth of electronic mail and electronic commerce, the physical mail stream will increasingly be utilized for sending and receiving packages. In an effort to lower operating costs and increase value for their customer base, many high volume delivery users and delivery system operators prepare packages and other items with automated equipment and presort and label the items prior to placement of the items into the delivery system. Delivery users realize a cost savings due to presorting, for example, because many delivery system operators provide discounts on presorted items because the amount of sorting necessary by the delivery system operator is reduced. Software can be used to assist sorting.

Therefore, there is a need for the United States Postal Service and many other organizations to efficiently provide evaluation of presorting software programs. More specifically, delivery system operators desire to efficiently evaluate presorting software programs in order to confirm that the software's performance is compatible with delivery system operation procedures. This is because in an increasingly competitive environment, it is essential for a service provider to reduce costs and exceed the expectations of those who receive a service.

SUMMARY OF THE INVENTION

In one aspect, a method for evaluating software includes generating a test deck, wherein the test deck is formulated to test the software for compliance with delivery system operation procedures, processing the test deck with the software, and grading the performance of the software for compliance with delivery system operation procedures.

In another aspect, a system for evaluating software includes a component for generating a test deck, wherein the test deck is formulated to test the software for compliance with delivery system operation procedures, a component for processing the test deck with the software, and a component for grading the performance of the software for compliance with delivery system operation procedures.

In yet another aspect, a computer-readable medium on which is stored a set of instructions for evaluating software, which when executed perform stages including generating a test deck, wherein the test deck is formulated to test the software for compliance with delivery system operation procedures, processing the test deck with the software, and grading the performance of the software for compliance with delivery system operation procedures.

Both the foregoing general description and the following detailed description are exemplary and are intended to provide further explanation of the invention as claimed.

BRIEF DESCRIPTION OF THE DRAWINGS

The accompanying drawings provide a further understanding of the invention and, together with the detailed description, explain the principles of the invention. In the drawings.

DETAILED DESCRIPTION

Figure 1:
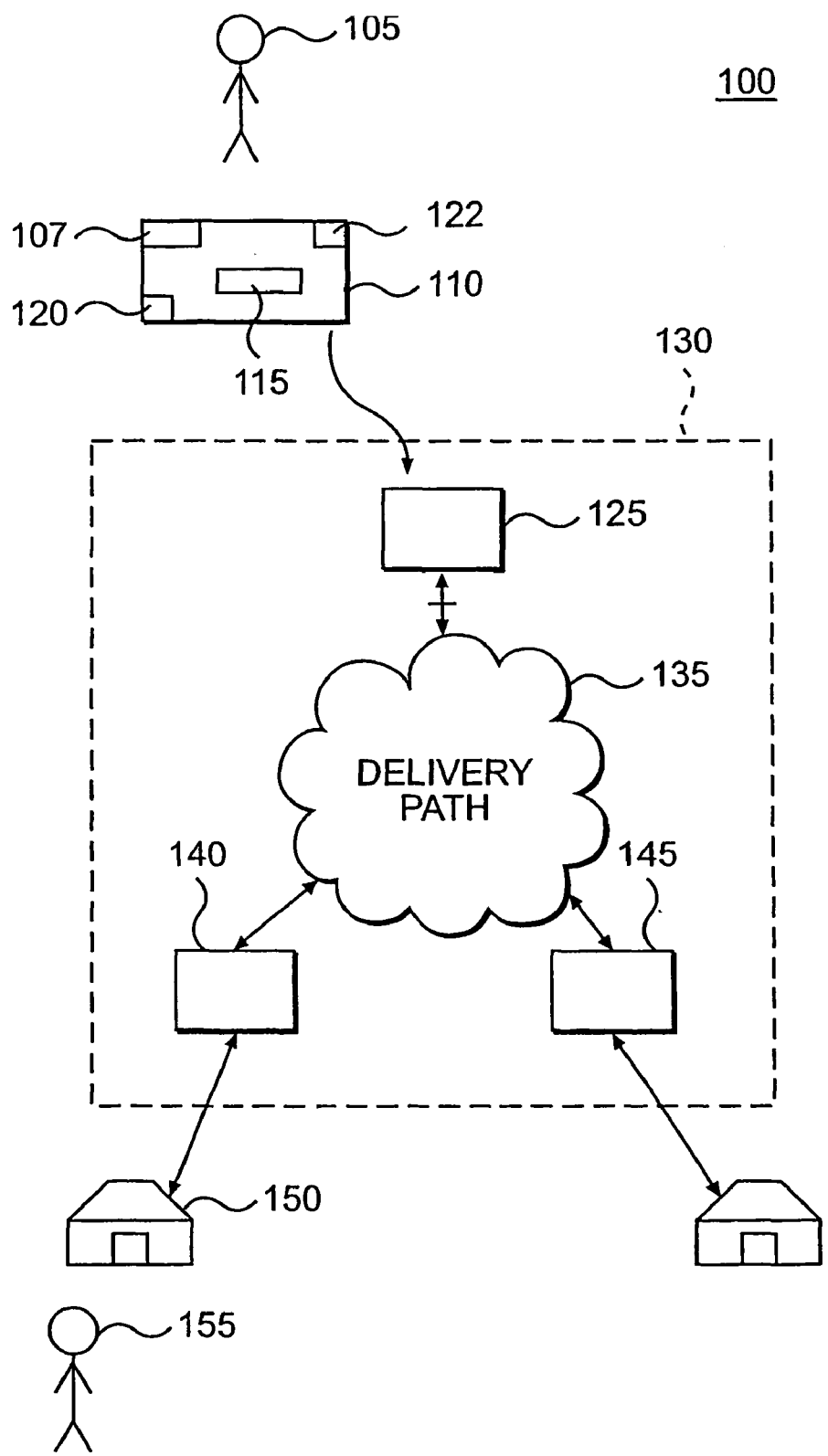
FIG. 1 is a functional block diagram of a system for providing item delivery service consistent with the present invention.

Reference will now be made to various embodiments consistent with this invention, examples of which are shown in the accompanying drawings and will be obvious from the description of the invention. In the drawings, the same reference numbers represent the same or similar elements in the different drawings whenever possible.

Exemplary Item Delivery System

FIG. 1 shows an exemplary item delivery system 100 that may be used in conjunction with the present invention. Within item delivery system 100, for example, an item 110 may be prepared manually by a user 105 or may be prepared utilizing an inserter under the supervision of user 105. An inserter is an automated device capable of assembling item 110 which may comprise flat mail, catalogs, magazines, mail pieces, United States Postal Service Priority Mail package, or a United States Postal Service Express Mail package. While item 110 may comprise any of the aforementioned, those skilled in the art will appreciate that still many other types of items may be utilized.

In exemplary item delivery system 100, materials are placed in item 110 that user 105 wishes to send to a recipient 155. With the materials placed in item 110, an address label 115 is placed on item 110 indicating a first address 150 of a recipient 155 and a return address 107 indicating where to return item 110, if necessary, are placed on item 110. In addition, a tracking indicia 120 is placed on item 110 along with a delivery payment coding 122. Tracking indicia 120 is utilized by a delivery system operator to facilitate the delivery of item 110. The use of tracking indicia 120 will be discussed in greater detail below. Delivery payment coding 122 indicates the payment amount user 105 believes is required by the delivery system operator to deliver item 110 to recipient 155. Delivery payment coding 122 may comprise a bar code, an image indicating an account from which delivery payment has been made, a postage stamp, or other types of codings as are known by those skilled in the art.

Tracking indicia 120 may comprise a bar code, a PLANET code or other types of indicia as are known by those skilled in the art. A bar code is a printed symbol used for recognition by a bar code scanner (reader). Traditional one-dimensional bar codes use the bar's width to encode a product or account number. Two-dimensional bar codes, such as PDF417, MAXICODE and DATAMATRIX, are scanned horizontally and vertically and hold considerably more data. Generally, PDF417 is widely used for general purposes, MAXICODE is used for high-speed sorting, and DATAMATRIX is used for marking small parts.

Historically, some delivery system operators sorted flat mail using POSTNET, a 12-digit barcode developed by the USPS consisting of alternating long and short bars indicating the destination of, for example, a mailpiece. Responding to the expanding needs of users, particularly heavy volume users, the PLANET code was developed on the foundation of the existing technical infrastructure. The PLANET Code is, in one respect, the opposite of the current POSTNET codes, reversing long bars for short and short bars for long. This innovation offers the convenience of a bar code that is easily applied using current bar-coding methods, and is readily scanned by the high-speed automation equipment already located in the plurality of plants comprising a delivery system 130 as discussed below.

In sending item 110, for example, user 105 places item 110 into a delivery system 130 at a sender plant 125. Item 110 is routed through delivery system 130 comprising sender plant 125, a delivery path 135, a first address plant 140, and a second address plant 145. Delivery path 135 comprises a plurality of plants similar to sender plant 125, first address plant 140, and second address plant 145. The plants within delivery system 130 contain, among other things, automated systems and sorting equipment and are designed to receive and process a plurality of items. Delivery system 130 is configured to sense tracking indicia 120 placed on item 110 as it passes through the elements of delivery system 130 directing the movement of item 110 through delivery system 130. Tracking indicia 120 sensed by delivery system 130 may comprise a bar code, a PLANET code, or other indicia as described herein above.

In the delivery process, item 110 is routed to the next most appropriate plant in delivery system 130. The appropriateness of the next plant in delivery system 130 depends upon the present location of the particular item in delivery system 130 and where item 110 is addressed. Ultimately, item 110 is routed in delivery system 135 to the plant that serves the delivery address indicated on item 110, according to established procedures. Thus, item 110 is routed from plant to plant within delivery system 130 wherein item 110 efficiently converges on the plant that serves the delivery address indicated on the item, in this case, first address plant 140. Throughout this process, delivery system 130 tracks the progress of items 110 through delivery system 130.

System for Evaluating Software

Consistent with the general principles of the present invention, a system for evaluating software comprises a component for generating a test deck, wherein the test deck is formulated to test the software for compliance with delivery system operation procedures. A test deck may be either physical simulated mail pieces or a set of simulated data, each of which comprises the data which would be sorted by scanning addresses information on, for example a mailpiece. In addition, the system comprises a component for processing the test deck with the software. And finally, the system comprises a component for grading the performance of the software for compliance with delivery system operation procedures.

Figure 2:
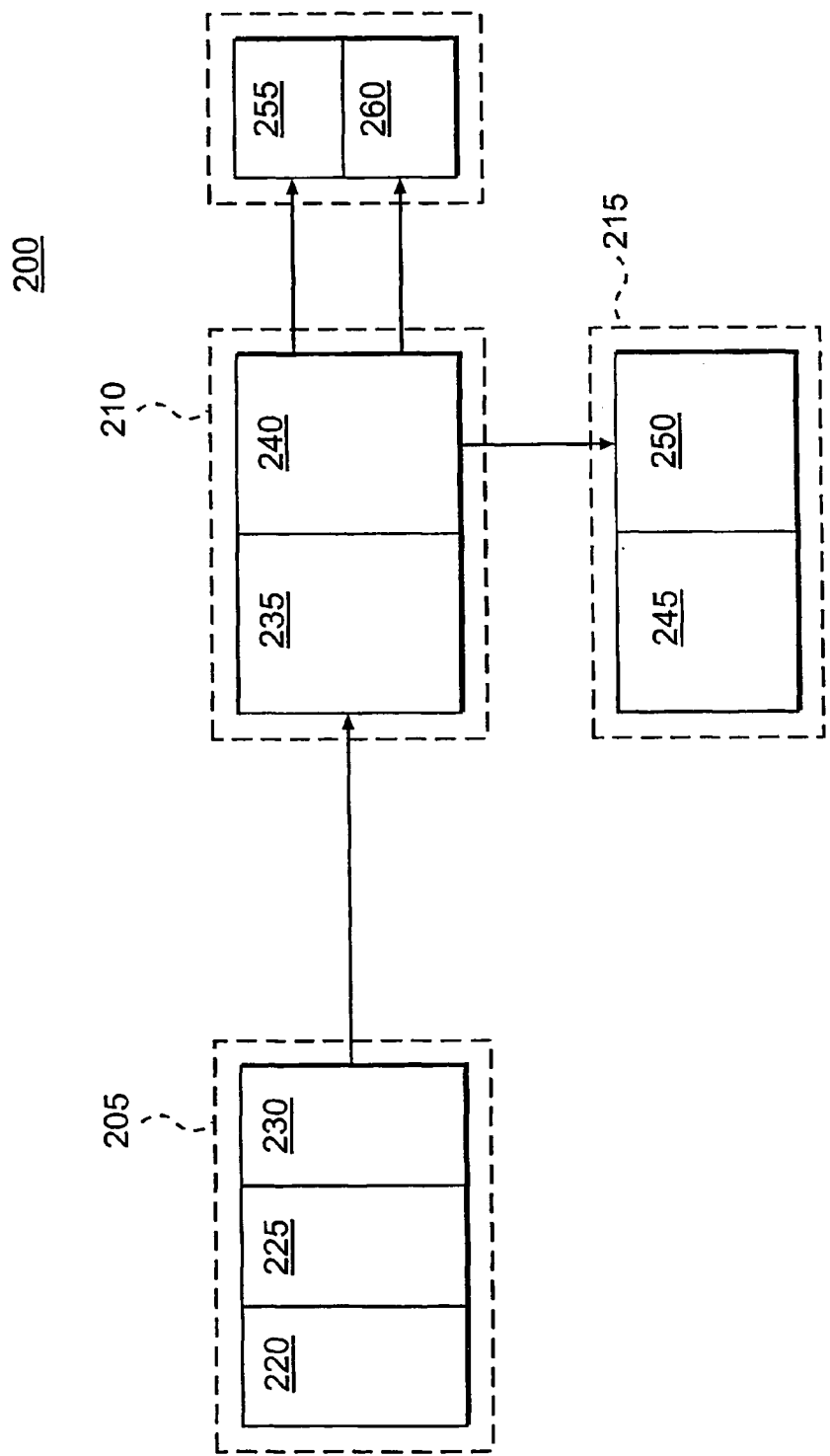
FIG. 2 is a functional block diagram of a system for evaluating software consistent with the present invention.

As herein embodied and illustrated in FIG. 2, a software evaluation system 200 comprises a component for generating a test deck 205, a component for processing the test deck 210, and a component for grading the performance of the software 215.

Generating component 205 may comprise a component for selecting at least one delivery system operation procedure 220, a component for selecting a test deck programming module 225, and a component for creating a test deck 230. Processing component 210 may comprise a component for executing the software 235, and a component for providing the output 240. Grading component 215 may comprise a component for selecting a grading programming module 245, and a component for generating a grade 250.

In addition, software evaluation system 200 may comprise a component for reporting infractions 255 and a component for grading compliance 260. An infraction may comprise any event that is not in accordance with delivery system operation procedures. Similarly, compliance may comprise any event that is in accordance with delivery system operation procedures Compliance may be evaluated with respect to, but is not limited to one of the following: presort qualification reports, postage statements, and container labels.

Each of the aforementioned components may comprise automated systems and high-speed automated sorting equipment containing, for example, image capturing systems such as digital video cameras. In addition, each of the aforementioned components may further comprise a personal computer or other similar microcomputer-based workstation. Those skilled in the art, however, will appreciate that the aforementioned components may comprise other types of computerized devices, such as hand-held devices, multiprocessor systems, microprocessor-based or programmable consumer electronics, minicomputers, mainframe computers, and the like. The aforementioned components may also be practiced in distributed computing environments where tasks are performed by remote processing devices and may have the capability of connecting to a communications system. Each of the aforementioned components may reside on separate systems, the same system, or a combination thereof.

Sorting performed by software evaluation system 200 may be performed on actual items comprising, for example, flat mail, catalogs, magazines, mail pieces, United States Postal Service Priority Mail package, or a United States Postal Service Express Mail package. While software evaluation system 200 may sort any of the aforementioned, those skilled in the art will appreciate that still many other types of items may be utilized. In addition to actual sorting, software evaluation system 200 may demonstrate its performance virtually without sorting actual items.

The communications system may comprise a wire line communications system, a wire line network, a wireless communications system, or a wireless network. "Wireless" can be defined as radio transmission via the airwaves, however, those skilled in the art will appreciate that various other communication techniques can be used to provide wireless transmission including infrared line of sight, cellular, microwave, satellite, packet radio, and spread spectrum radio.

Method for Evaluating Software

Figure 3:
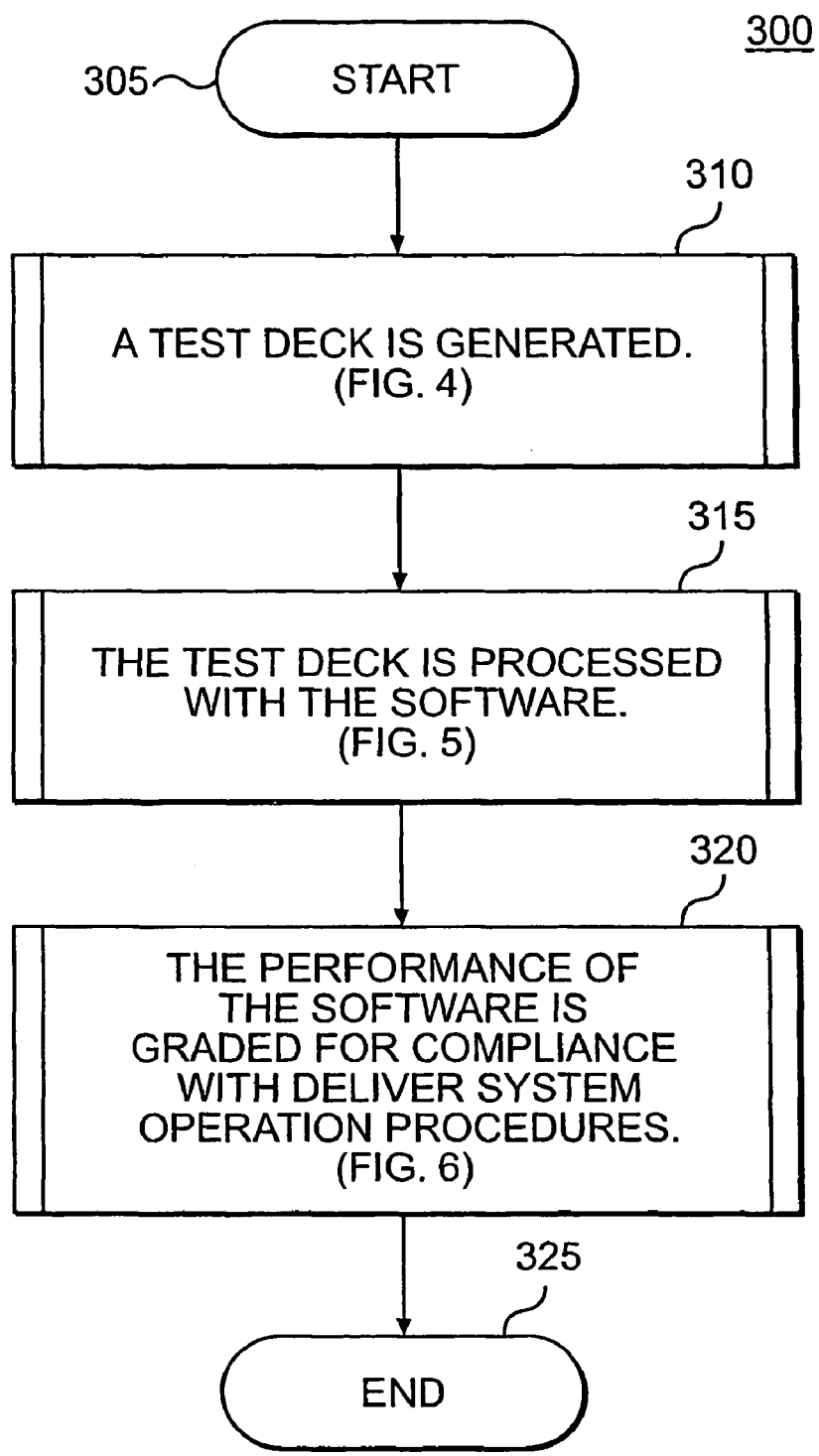
FIG. 3 is a flow chart of an exemplary method for evaluating software consistent with the present invention.
Figure 4:
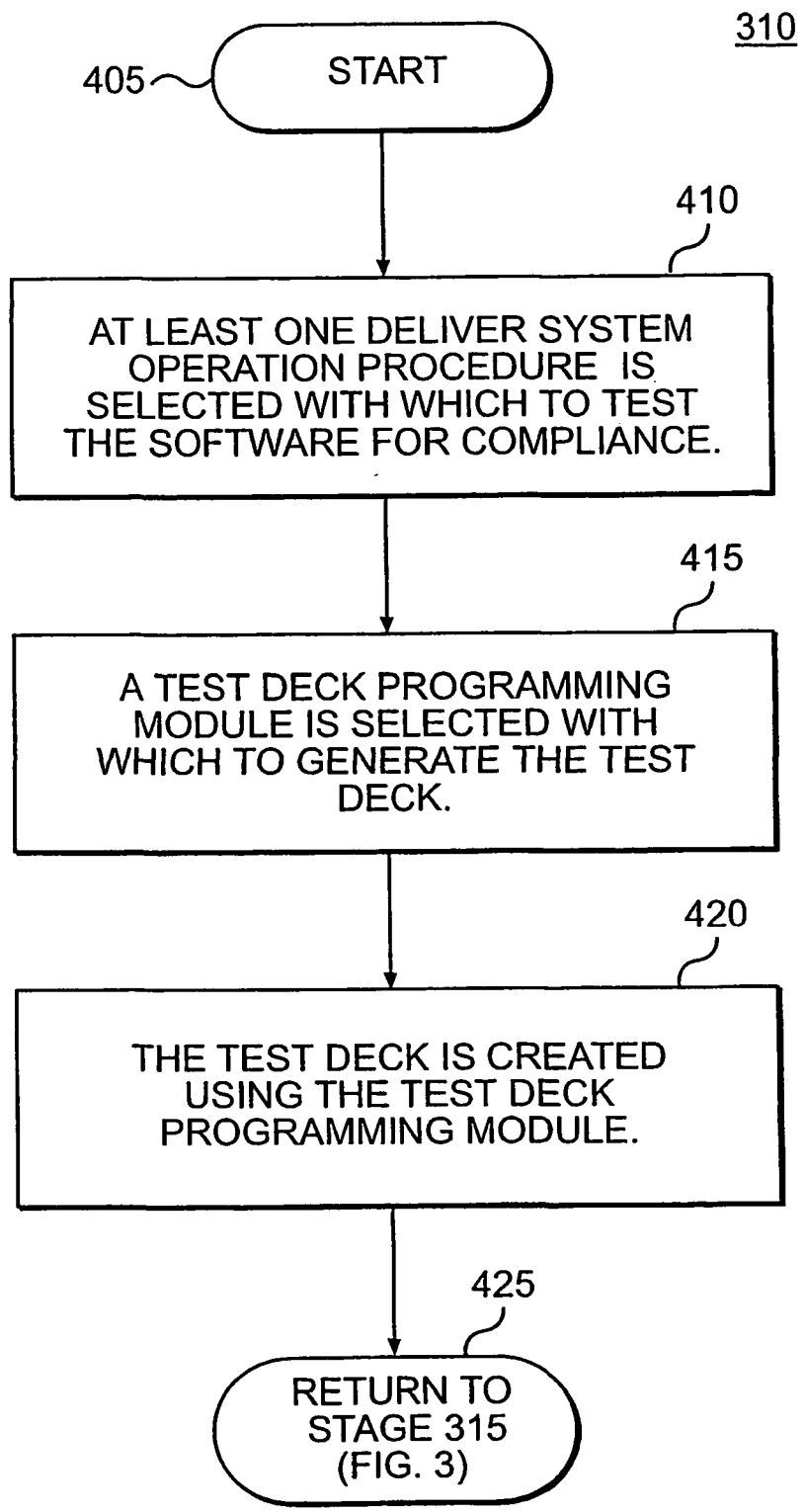
FIG. 4 is a flow chart of an exemplary subroutine used in the exemplary method of FIG. 3 for generating a test deck consistent with the present invention.

FIG. 3 is a flow chart setting forth the general stages involved in an exemplary method 300 for evaluating software. Method 300 begins at starting block 305 and proceeds to exemplary subroutine 310 where a test deck is generated. The stages of subroutine 310 are shown in FIG. 4 and will be discussed in greater detail below.

Figure 5:
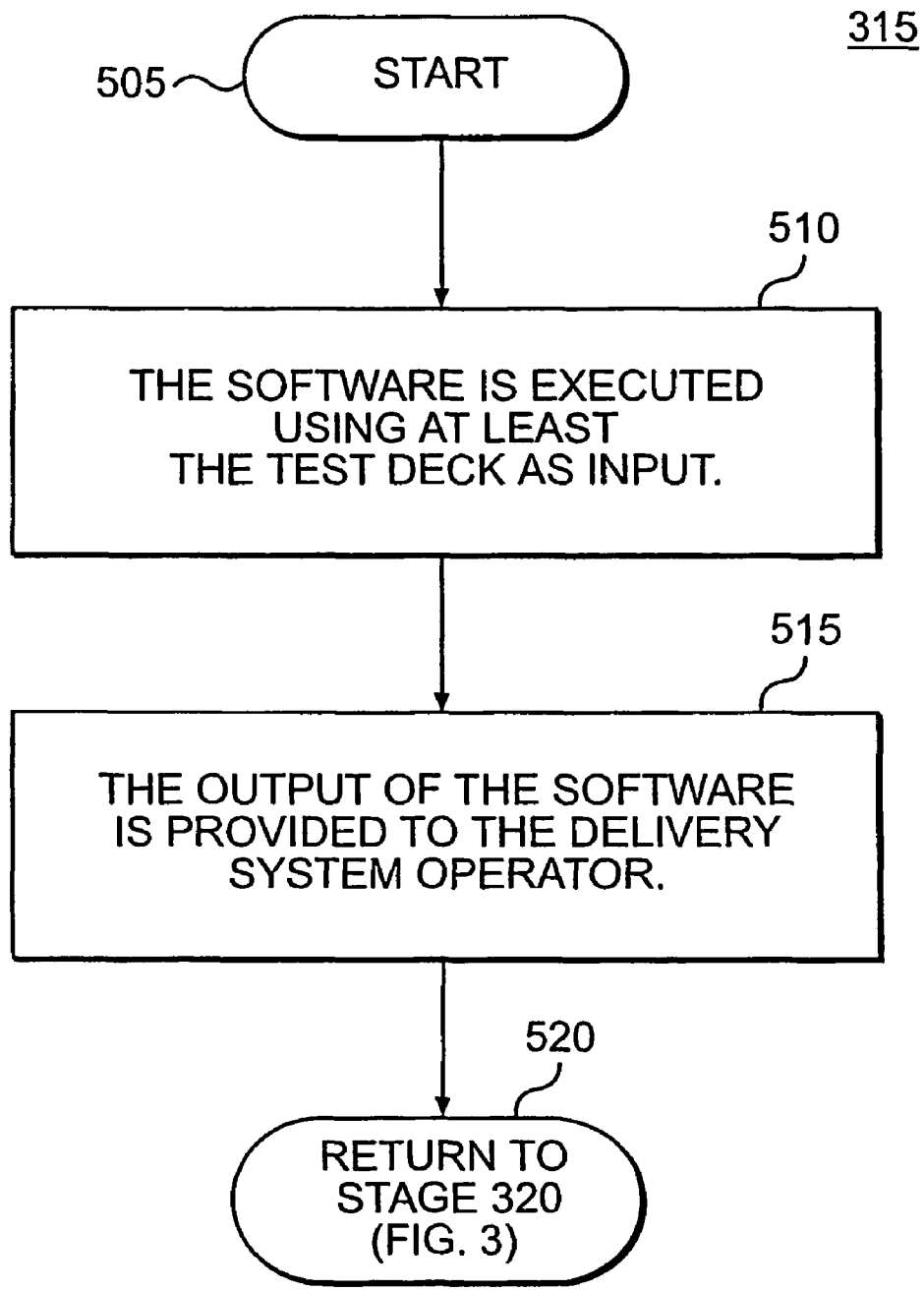
FIG. 5 is a flow chart of an exemplary subroutine used in the exemplary method of FIG. 3 for processing the test deck consistent with the present invention.

From subroutine 310, method 300 advances to exemplary subroutine 315 where the test deck is processed with the software. The stages of subroutine 315 are shown in FIG. 5 and will be discussed in greater detail below.

Figure 6:
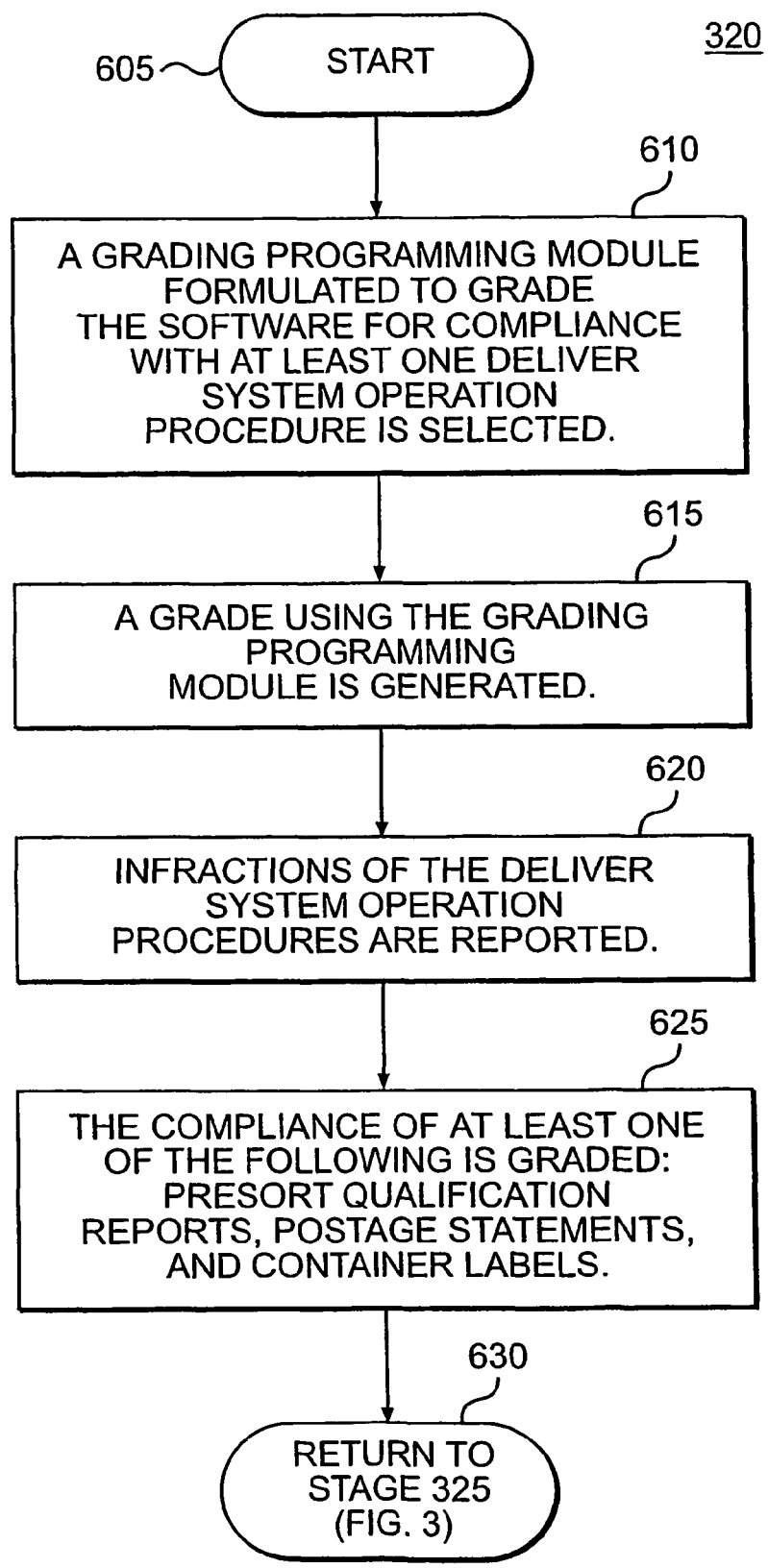
FIG. 6 is a flow chart of an exemplary subroutine used in the exemplary method of FIG. 3 for grading the performance of the software consistent with the present invention.

After the test deck is processed with the software in subroutine 315, method 300 continues to exemplary subroutine 320 where the performance of the software is graded for compliance with delivery system operation procedures. The stages of subroutine 320 are shown in FIG. 6 and will be discussed in greater detail below.

From subroutine 320 where the performance of the software is graded for compliance with delivery system operation procedures, method 300 ends at stage 325.

Generating a Test Deck

FIG. 4 is a flow chart setting forth the general stages involved in an subroutine 310 for generating a test deck. Subroutine 310 begins at starting block 405 and proceeds to stage 410 where at least one delivery system operation procedure is selected with which to test the software for compliance. For example, the delivery system operation procedure may comprise the USPS Domestic Mail Manual (DMM) that contains the basic standards governing domestic mail services; descriptions of the mail classes and services and conditions governing their users; and standards for rate eligibility and mail preparation. Domestic mail may be classified by size, weight, content, service, and other factors. Those skilled in the art will appreciate that a delivery system operation procedure other than the DDM may be employed and utilized by delivery system operators other than the USPS.

Once a delivery system operation procedure is selected in stage 410, subroutine 310 continues to stage 415 where a test deck programming module is selected with which to generate the test deck. The test deck programming module is formulated to generate the test deck to test the software for compliance with the at least one delivery system operation procedure.

A process for selecting the test deck programming module may begin with a test designer developing an expert knowledge of the delivery system operation procedure and keeping that knowledge current. Beginning with formulating overall testing goals, the designer may then move to defining specific routines that can be used as generic building blocks to make a test deck programming module. These routines normally produce simulated data entries of scanned mail pieces that will test compliance with only one regulation. The test deck programming modules may comprise one or more routines designed to test a specific regulation. Because there may be many different ways to presort items, one approach is to create a pool of test deck programming modules designed to generate specific numbers of simulated data entries that should be presorted to specific sortation levels.

From stage 415, subroutine 310 advances to stage 420 where the test deck is created using the test deck programming module. Entries comprising the test deck may include geographical segment codes chosen at random where the geographical segment codes may comprise United States Postal Service ZIP code, or a United States Postal Service ZIP+4 code.

The test deck programming module may randomize the tests while testing for compliance with the same regulations using, for example, ZIP codes selection routine in the test deck programming module. At first, the test deck programming module may shuffle entries based on, for example, five-digit ZIP code schemes, three-digit ZIP code schemes, sectional center facilities (SCF), bulk mail centers (BMC), area distribution centers (ADC), and automated area distribution centers (AADC). Then, during operation, it may continually reshuffle, for example, entries by the three-digit ZIP codes still unused by the test deck programming module. The shuffling may be accomplished with random numbers generated by the test deck programming module based on, for example, the internal clock of the component for generating a test deck 205. This insures that the developer of the software tested cannot test one product and then reproduce those results and represent them as results from another software product.

Although, for example, the actual ZIP codes used in each test deck are different, test decks may be employed that contain the same number of entries to each targeted sortation level. Each test deck may test how the software developer complies with delivery system operation procedures with equal efficiency and effectiveness. Because the test deck programming module picks, for example, ZIP codes at random, no two test decks, even for the same test, are ever identical. In addition, sorting by street address may further randomizes the test deck.

After the test deck is created using the test deck programming module in stage 420, subroutine 310 advances to stage 425 and returns to stage 315 of FIG. 3.

Processing the Test Deck

FIG. 5 is a flow chart setting forth the general stages involved in an subroutine 315 for processing the test deck. Subroutine 315 begins at starting block 505 and proceeds to stage 510 where the software is executed using at least the test deck as input. While the test deck is used to test the software, those skilled in the art will appreciate that input other than the test deck may be used.

Once the software is executed in stage 510, subroutine 315 continues to stage 515 where the output of the software is provided to the delivery system operator. The output may comprise physically sorted exemplary items or may comprise a computerized file evidencing the sortation performed.

After the output of the software is provided to the delivery system operator in stage 515, subroutine 315 advances to stage 520 and returns to stage 320 of FIG. 3.

Grading the Performance of the Software

FIG. 6 is a flow chart setting forth the general stages involved in an subroutine 320 for grading the performance of the software. Subroutine 320 begins at starting block 605 and proceeds to stage 610 where a grading programming module formulated to grade the software for compliance with at least one delivery system operation procedure is selected. For example, each test deck programming model formulated to generate the test deck may have a corresponding grading programming module formulated to grade the software for compliance with at least- one delivery system operation procedure is selected.

Once a grading programming module formulated to grade the software for compliance with at least one delivery system operation procedure is selected in stage 610, subroutine 320 continues to stage 615 where a grade using the grading programming module is generated.

For example, the grading programming module may read the test deck and check the data on each item for internal consistency. In a First Class auto letters presort, for example, an item comprising a mail piece in a three-digit ZIP code tray assigned the five-digit ZIP code postage rate would cause the grading programming module to generate an error message.

From stage 615 where a grade using the grading programming module is generated, subroutine 320 advances to stage 620 where infractions of the delivery system operation procedures are reported. The grading programming module may not attempt to determine how well a software product presorts a test deck, however, it may determine if any delivery system operation procedures were violated.

Once infractions of the delivery system operation procedures are reported in stage 620, subroutine 320 continues to stage 625 where the compliance of presort qualification reports, postage statements, or container labels are graded. For example, in addition to examining how the software presorted a test decks, presort qualification reports, postage statements, and container labels (including the label barcodes) may also be graded. As the software reads the items, for example, totals by container and destination may also be accrued. These totals may then be checked in a variety of ways and an error message may be generated by the software if a total indicates a failure to follow any delivery system operation procedure.

These delivery system operation procedures include, but are not limited to, those governing container and package minimums and maximums, sorting the mail to its finest extent, the appropriate use of containers, and the proper mixture of mail for co-containerization. For example, if the total number of items in a mail sack is less than 125 and the total weight of those pieces falls below 15 pounds, the program may generate an illegal sack message as violating a delivery system operation procedure.

After the compliance of at least one of the following is graded: presort qualification reports, postage statements, and container labels in stage 625, subroutine 320 advances to stage 630 and returns to stage 325 of FIG. 3.

It will be appreciated that a system in accordance with an embodiment of the invention can be constructed in whole or in part from special purpose hardware or a general purpose computer system, or any combination thereof. Any portion of such a system may be controlled by a suitable program. Any program may in whole or in part comprise part of or be stored on the system, on a computer-readable storage medium, in a conventional manner, such as RAM, ROM, or disk, or it may in whole or in part be provided in to the system over a network or other mechanism, such as a communication medium, for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. A method for evaluating software comprising:
    generating a test deck, wherein the test deck is formulated to test the software for compliance with delivery system operation procedures;
    processing the test deck with the software; and
    grading the performance of the software for compliance with delivery system operation procedures,
    wherein generating the test deck comprises:
        selecting at least one delivery system operation procedure with which to test the software for compliance;
        selecting a test deck programming module with which to generate the test deck, the test deck programming module formulated to generate the test deck to test the software for compliance with the at least one delivery system operation procedure; and
        creating the test deck using the test deck programming module.

2. The method of claim 1, wherein processing the test deck further comprises:
    executing the software using at least the test deck as input; and
    providing the output of the software to the delivery system operator.

3. The method of claim 1, wherein grading the performance of the software further comprises:
    selecting a grading programming module formulated to grade the software for compliance with at least one delivery system operation procedure; and
    generating a grade using the grading programming module.

4. The method of claim 1, wherein addresses comprising the test deck comprise geographical segment codes chosen at random.

5. The method of claim 4, wherein the geographical segment code comprises at least one of the following: a United States Postal Service ZIP code, and a United States Postal Service ZIP+4 code.

6. The method of claim 1, wherein the test deck comprises addresses and addresses within the test deck are sorted by street address.

7. The method of claim 1, wherein grading the performance of the software further comprises reporting infractions of the delivery system operation procedures.

8. The method of claim 1, further comprising grading the compliance of at least one of the following: presort qualification reports, postage statements, and container labels.

9. A system for evaluating software comprising:
    an input terminal for receiving software; and
    a processor coupled to the input terminal for:
        generating a test deck, wherein the test deck is formulated to test the software for compliance with delivery system operation procedures;
        processing the test deck with the software; and
        grading the performance of the software for compliance with delivery system operation procedures,
    wherein generating the test deck further comprises:
    selecting at least one delivery system operation procedure with which to test the software for compliance;
    selecting a test deck programming module with which to generate the test deck, the test deck programming module formulated to generate the test deck to test the software for compliance with the at least one delivery system operation procedure; and
    creating the test deck using the test deck programming module.

10. The system of claim 9, wherein processing the test deck further comprises:
    executing the software using at least the test deck as input; and
    providing the output of the software to the delivery system operator.

11. The system of claim 9, wherein grading the performance of the software further comprises:
selecting a grading programming module formulated to grade the software for compliance with at least one delivery system operation procedure; and
generating a grade using the grading programming module.

12. The system of claim 9, wherein addresses comprising the test deck comprise geographical segment codes chosen at random.

13. The system of claim 12, wherein the geographical segment code comprises at least one of the following: a United States Postal Service ZIP code, and a United States Postal Service ZIP+4 code.

14. The system of claim 9, wherein the test deck comprises addresses and addresses within the test deck are sorted by street address.

15. The system of claim 9, further comprising reporting infractions of the delivery system operation procedures.

16. The system of claim 9, further comprising grading the compliance of at least one of the following: presort qualification reports, postage statements, and container labels.

17. A computer-readable storage medium on which is stored a set of instructions for evaluating software, which when executed perform stages comprising:
generating a test deck, wherein the test deck is formulated to test the software for compliance with delivery system operation procedures;
processing the test deck with the software; and
grading the performance of the software for compliance with delivery system operation procedures,
wherein generating the test deck further comprises:
selecting at least one delivery system operation procedure with which to test the software for compliance;
selecting a test deck programming module with which to generate the test deck, the test deck programming module formulated to generate the test deck to test the software for compliance with the at least one delivery system operation procedure; and
creating the test deck using the test deck programming module.

18. The computer-readable storage medium of claim 17, wherein processing the test deck further comprises:
executing the software using at least the test deck as input; and
providing the output of the software to the delivery system operator.

19. The computer-readable storage medium of claim 17, wherein grading the performance of the software further comprises:
selecting a grading programming module formulated to grade the software for compliance with at least one delivery system operation procedure; and
generating a grade using the grading programming module.

20. The computer-readable storage medium of claim 17, wherein addresses comprising the test deck comprise geographical segment codes chosen at random.

21. The computer-readable storage medium of claim 17, wherein the geographical segment code comprises at least one of the following: a United States Postal Service ZIP code, and a United States Postal Service ZIP+4 code.

22. The computer-readable storage medium of claim 17, wherein the test deck comprises addresses and addresses within the test deck are sorted by street address.

23. The computer-readable storage medium of claim 17, wherein grading the performance of the software further comprises reporting infractions of the delivery system operation procedures.

24. The computer-readable storage medium of claim 17, further comprising grading the compliance of at least one of the following: presort qualification reports, postage statements, and container labels.

25. A method for evaluating software comprising:
selecting at least one delivery system operation procedure with which to test the software for compliance;
selecting a test deck programming module with which to generate a test deck, the test deck programming module formulated to generate the test deck to test the software for compliance with the at least one delivery system operation procedure;
creating the test deck using the test deck programming module, wherein addresses comprising the test deck comprise geographical segment codes chosen at random, the geographical segment code comprises at least one of the following: a United States Postal Service ZIP code, and a United States Postal Service ZIP+4 code, and wherein addresses comprising the test deck are sorted by street address;
executing the software using at least the test deck as input;
providing the output of the software to the delivery system operator;
selecting a grading programming module formulated to grade the software for compliance with at least one delivery system operation procedure;
generating a grade using the grading programming module;
grading the compliance of at least one of the following: presort qualification reports, postage statements, and container labels; and
reporting infractions of the delivery system operation procedures.

* * * * *